(12) United States Patent
Deguchi et al.

(10) Patent No.: US 8,295,141 B2
(45) Date of Patent: Oct. 23, 2012

(54) PATTERN AND METHOD FOR FORMING THE SAME

(75) Inventors: Hiroshi Deguchi, Yokohama (JP);
Kawori Tanaka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 439 days.

(21) Appl. No.: 12/339,522

(22) Filed: Dec. 19, 2008

(65) Prior Publication Data

US 2010/0054100 A1  Mar. 4, 2010

(30) Foreign Application Priority Data

Dec. 27, 2007 (JP) .................... 2007-337267

(51) Int. Cl.
*G11B 7/00* (2006.01)
(52) U.S. Cl. .......... 369/84; 369/94; 369/283; 369/275.4
(58) Field of Classification Search .............. 369/84, 369/94, 283, 275.1, 275.3, 275.4; 427/162
See application file for complete search history.

(56) References Cited

U.S. PATENT DOCUMENTS

| | | | | |
|---|---|---|---|---|
| 5,742,567 | A * | 4/1998 | Ikeya ............. | 369/14 |
| 6,022,604 | A * | 2/2000 | Del Mar et al. ........ | 428/64.1 |
| 6,096,398 | A | 8/2000 | Yuzurihara et al. | |
| 6,426,936 | B1 | 7/2002 | Shinotsuka et al. | |
| 6,599,385 | B1 * | 7/2003 | Liao et al. ............ | 156/272.2 |
| 6,731,578 | B1 * | 5/2004 | Sako et al. ........... | 369/53.23 |
| 6,741,545 | B2 | 5/2004 | Shinotsuka et al. | |
| 6,958,180 | B2 | 10/2005 | Hibino et al. | |
| 7,061,702 | B2 * | 6/2006 | Yoshimura et al. ..... | 360/16 |
| 7,417,930 | B2 | 8/2008 | Yuzurihara et al. | |
| 7,438,965 | B2 | 10/2008 | Ohkura et al. | |
| 7,688,703 | B2 * | 3/2010 | Konishi ............. | 369/275.1 |
| 2003/0002162 | A1 * | 1/2003 | Hira ................ | 359/619 |
| 2003/0152009 | A1 * | 8/2003 | Usui et al. ............ | 369/59.25 |
| 2005/0128926 | A1 * | 6/2005 | Kai et al. ............ | 369/125 |
| 2006/0077884 | A1 * | 4/2006 | Ohkura et al. ........ | 369/275.4 |
| 2006/0153053 | A1 | 7/2006 | Deguchi et al. | |
| 2006/0183052 | A1 | 8/2006 | Deguchi et al. | |
| 2006/0187789 | A1 | 8/2006 | Yuzurihara et al. | |
| 2006/0246270 | A1 | 11/2006 | Takada et al. | |
| 2007/0023976 | A1 * | 2/2007 | Kolesnychenko ...... | 264/496 |
| 2009/0016209 | A1 | 1/2009 | Ikeda et al. | |

FOREIGN PATENT DOCUMENTS

| | | |
|---|---|---|
| JP | 01-208737 | 8/1989 |
| JP | 1-261601 | 10/1989 |
| JP | 02-146124 | 6/1990 |
| JP | 05-266514 | 10/1993 |
| JP | 07-169178 | 7/1995 |
| JP | 07-311984 | 11/1995 |
| JP | 3579798 | 7/2004 |
| JP | 2006-4594 | 1/2006 |
| JP | 3843706 | 8/2006 |
| JP | 2006-241446 | 9/2006 |
| JP | 3899779 | 1/2007 |
| JP | 2008-192281 | 8/2008 |
| WO | WO 2004/114382 | 12/2004 |

* cited by examiner

*Primary Examiner* — Thomas Alunkal
(74) *Attorney, Agent, or Firm* — Dickstein Shapiro LLP

(57) ABSTRACT

The present invention provides a method for forming a pattern, containing: stacking a master having at least a two-dimensional pattern or a three-dimensional pattern formed thereon and a pattern-transferring material containing at least a recording layer which changes a state thereof as light is transmitted thereto; and transmitting light to the recording layer so as to transfer the pattern of the master onto the recording layer.

14 Claims, 6 Drawing Sheets

PATTERN AND METHOD FOR FORMING THE SAME

BACKGROUND OF THE INVENTION

1. Field of the Invention

The present invention reproduces a pattern from the master having at least any one of a two-dimensional pattern or a three-dimensional pattern formed thereon, and in particular relates to a method for forming a pattern, by which a two-dimensional flat pattern can be efficiently reproduced, and a pattern.

2. Description of the Related Art

In recent years, research and development have been actively carried out for a device (hereinafter called a "microstructural body") having a microstructure produced by using a nano-order processing technology. Such a microstructural body has been conventionally produced by various methods. In detail, the following methods may be listed.

(1) Production method utilizing differences in surface property of organic molecules (2) Optical molding method using a laser, ultraviolet ray lamps, etc.

(3) Cubic structure production method using one of electron beam and ion beam (4) Method using a semiconductor process (5) Production method using materials whose state changes by heat Here, the method (1) described above forms organic molecules having various functional groups at predetermined positions of the base layer of a substrate, etc., and selectively forms microstructural bodies utilizing differences in the surface characteristics thereof as disclosed in, for example, Japanese Patent Application Laid-Open (JP-A) No. 2002-023356.

The method (2) described above forms a liquefied optical hardening type resin to be like a thin film by irradiating ultraviolet rays and laser light thereto, and forms a microstructural body by sequentially stacking the thin film as disclosed in, for example JP-A No. 07-329188.

The cubic structure production method (3) using one of electron beam and ion beam, described above, produces a microstructural body by irradiating an electron beam, the intensity of which is adjusted, onto a resist film coated on a substrate as disclosed in, for example, JP-A No. 01-261601.

The semiconductor process (4) described above forms a microstructural body by repeating formation of a mask pattern utilizing photolithography and elimination of exposed portions by etching.

The production method (5) using materials whose state changes by heat, described above, forms micro patterns directly on a microstructural body by utilizing a phenomenon in which the state of the microstructural body changes according to a change in heat that is generated in the microstructural body by varying the irradiation condition of laser light without utilizing any photolithography as disclosed in, for example, JP-A No. 2006-004594.

However, in all of these methods, there is a problem that the facility becomes expensive to inexpensively reproduce a number of microstructural bodies in view of reproduction of microstructural bodies, and the productivity is inferior since a long period of time is required to reproduce the same.

A nano-imprinting method has been proposed as one of the units configured to solve the problem (Refer to International Publication No. WO 2004/114382). This nano-imprinting method transfers the pattern of a master onto a pattern-transferring material by pressing the master having a nanometer scale pattern onto the pattern-transferring material. According to the nano-imprinting method, there is an advantage of producing a microstructural body at high productivity and at a low cost.

However, since, with the nano-imprinting method, the pattern of the master is of a cubic structure (three-dimensional structure), there is a restriction in regard to the master material, wherein it is difficult to produce the master. In addition, there is another problem that the master is subjected to mechanical deterioration because the master is pressed to a pattern-transferring material at a fixed pressure level. Further, since it is impossible to reproduce a three-dimensional pattern to a two-dimensional flat pattern by a simple method, the current situation is such that further improvement and development are desired.

BRIEF SUMMARY OF THE INVENTION

The present invention reproduces a pattern from a master having at least any one of a two-dimensional pattern or a three-dimensional pattern formed thereon, and in particular it is an object to provide a pattern and a method for forming a two-dimensional flat pattern with only very slight mechanical deterioration of the master, by which patterns can be efficiently reproduced in a short period of time by a simple facility.

Means for solving the above-mentioned problems are as follows:

<1> A method for forming a pattern, containing: stacking a master having at least a two-dimensional pattern or a three-dimensional pattern formed thereon, and a pattern-transferring material containing at least a recording layer which changes a state thereof as light is transmitted thereto; and transmitting light to the recording layer so as to transfer the pattern of the master onto the recording layer.

In the method for forming a pattern as defined in <1>, the master having at least the two-dimensional pattern or the three-dimensional pattern formed thereon and the pattern-transferring material having at least the recording layer which changes a state thereof as light is transmitted thereto are stacked together, and the pattern can be reproduced in the recording layer by transmitting light to the recording layer. Also, the master causes extremely slight physical deterioration, and the pattern can be efficiently reproduced in a short period of time by means of a simple equipment.

<2> The method for forming a pattern according to <1>, wherein the pattern is a planar pattern.

<3> The method for forming a pattern according to <1>, wherein the master is optically transmissive, and the light is transmitted through the master.

<4> The method for forming a pattern according to <1>, wherein the pattern is a concave-convex pattern.

<5> The method for forming a pattern according to <1>, wherein the master is stacked to the pattern-transferring material so that a surface of the master on which the pattern is formed is faced to the pattern-transferring material.

<6> The method for forming a pattern according to <1>, wherein the recording layer is formed of an inorganic material.

<7> The method for forming a pattern according to <1>, wherein an optical reflection member is disposed on a side of the pattern-transferring material which is opposed to a side thereof to where the light is transmitted at the time when the light is transmitted to the recording layer.

<8> The method for forming a pattern according to <7>, wherein the optical reflection member is formed of a metallic material.

<9> The method for forming a pattern according to <1>, wherein the pattern-transferring material consists of the recording layer.
<10> The method for forming a pattern according to <1>, wherein the pattern-transferring material further comprises a protection layer disposed on a surface of the recording layer.
<11> The method for forming a pattern according to <1>, wherein the pattern transferred onto the recording layer is formed from different crystal phases.
<12> The method for forming a pattern according to <1>, wherein an optical material is disposed between the master and the pattern-transferring material which are stacked together.
<13> The method for forming a pattern according to <1>, wherein a refractive index contrasting material is disposed on the pattern of the master stacked on the pattern-transferring material, and wherein the refractive index contrasting material has a different refractive index to a refractive index of the pattern-transferring material.
<14> The method for forming a pattern according to <1>, wherein a light path changing material is disposed on the pattern of the master stacked on the pattern-transferring material, and wherein the light path changing material is configured to change a light path of the light transmitted to the pattern-transferring material through the master.
<15> The method for forming a pattern according to <14>, wherein the light path changing material is beads.
<16> A pattern obtained by a method containing stacking a master having at least a two-dimensional pattern or a three-dimensional pattern formed thereon and a pattern-transferring material comprising at least a recording layer which changes a state thereof as light is transmitted to thereto; and transmitting light to the recording layer so as to transfer the pattern of the master onto the recording layer.
<17> The pattern according to <16>, wherein the pattern is a planar pattern.
<18> An element having a pattern obtained by a method comprising stacking a master having at least a two-dimensional pattern or a three-dimensional pattern formed thereon and a pattern-transferring material having at least a recording layer which changes a state thereof as light is transmitted thereto; and transmitting light to the recording layer so as to transfer the pattern of the master onto the recording layer to thereby form the pattern of the element.

The element as defined in <18> has the pattern, especially the planar pattern, which is reproduced from at least the two-dimensional pattern or the three-dimensional pattern, and is applicable to, for example, various types of biosensors, a DNA chip, a protein detection chip, a healthcare chip of a μTAS (micro total analysis system), a DNA transistor, a security system, an optical element utilizing a nanometer scale effect, a metamaterial, and the like.

According to the present invention, the above-described problems in the art can be solved, there can be provided a method for forming a pattern and a pattern, wherein the pattern is reproduced from a master having at least a two dimensional pattern or a three dimensional pattern is reproduced, especially the two dimensional planer pattern can be reproduced, physical deterioration caused in the master is extremely slight, and the pattern can be efficiently reproduced in a short-period of time by means of a simple equipment.

DETAILED DESCRIPTION

Pattern and Pattern Forming Method

Figure 1:
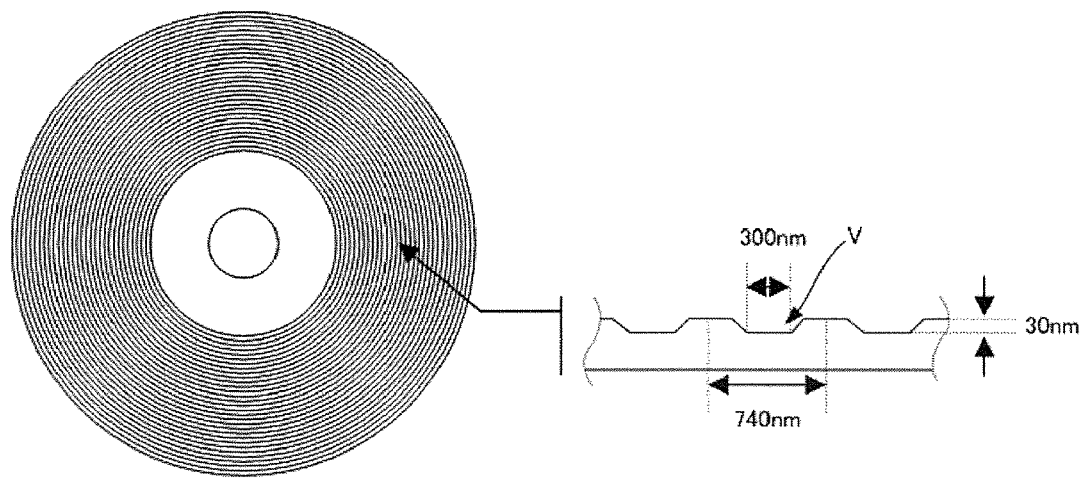
FIG. 1 is a schematic view showing one example of a master used in Embodiment 1.

A pattern is obtained by stacking a master having at least a two-dimensional pattern or a three-dimensional pattern formed thereon and a pattern-transferring material containing at least a recording layer which changes a state thereof as light is transmitted thereto, and transmitting light to the recording layer so as to transfer the pattern of the master to the recording layer.

It is preferable that the pattern formed on the recording layer in accordance with the pattern forming method is a planar pattern.

In the pattern forming method, the master having at least a two-dimensional pattern or a three-dimensional pattern and the pattern-transferring material containing the recording layer which changes the state thereof as light is transmitted thereto are stacked together, and light is transmitted thereto so as to transfer the pattern of the master to the recording layer.

The pattern is formed by the pattern forming method, and the pattern is a planar pattern.

Herein, the "planar pattern" includes not only a flat pattern almost free from any concave and convex parts but also a pattern having slightly concave and convex parts. Specifically, it means that the maximum height of the pattern is 50 nm or less where the reference length of the pattern is set at 1 μm.

Hereinafter, the details of the pattern will be described through a description of the pattern forming method.
<Master>

The shape, structure, size, material and the like of the master are appropriately selected depending on the intended purpose without any restrictions, provided that the master has at least a two-dimensional pattern or a three-dimensional pattern formed on the surface thereof. For example, the shape of the master may be a flat plate, circular plate, disk, card, film, sheet, or the like. The size thereof is suitably adjusted depending on the intended use or the like, without any restriction. The structure thereof is appropriately designed depending on the intended purpose without any restriction, and for example, the master may be formed of one member, or two or more members.

The material of the master is appropriately selected depending on the intended purpose without restriction provided that it is optically transmissive. Examples thereof include glass, ceramic, resin, and the like. Among these, the resin is preferable in terms of its moldability and cost performance.

Examples of the ceramic are quartz, silicon, and $SiO_2$, and the like.

Examples of the resin are polycarbonate resin, acrylic resin, epoxy resin, polystyrene resin, acrylonitrile-styrene copolymer, polyethylene resin, polypropylene resin, silicone resin, fluorine resin, ABS resin, urethane resin, and the like.

Among these, the polycarbonate resin and acrylic resin are preferable in terms of their excellent moldability, optical characteristics, and cost performance.

A pattern of the master is appropriately selected from a two-dimensional pattern or a three-dimensional pattern without any restriction, provided that it generates any difference (e.g. optical characteristics, difference in light paths, or shape) with respect to light (reproduction light). Examples thereof include: those patterned in their forms such as a concave-convex pattern, a pit (dented) pattern, a groove pattern, and the like; and those in which characters, symbols, patterns, or drawings are formed of materials having mutually different optical characteristics.

The size of the pattern is appropriately selected depending on the intended purpose without any restriction, and any size thereof of from nano-order to milli-order can be reproduced.

Specific examples of the master include a substrate having a pit (dented) pattern, a substrate having a spiral groove on the surface thereof, a substrate having characters, drawings, symbols, patterns or the like drawn on the surface thereof by laser marker or etching, a substrate having characters, drawings, symbols, patterns or the like drawn on the surface thereof by lifting, a substrate having characters, drawings, symbols, patterns or the like drawn on the surface thereof by using materials having mutually different optical transmissivity or reflectivity, and the like.

<Pattern-Transferring Material>

The pattern-transferring material contains at least a recording layer which changes a state thereof as light is transmitted thereto, and optionally contains other layers such as an optical reflection member, protection layer, and the like.

Also, the pattern-transferring material may consist of the recording layer.

A change in state of the recording layer means that a pattern can be formed by a change in a crystallization or amorphous structure, shape, or a coupling state of atoms or molecules in the recording layer in response to exothermic reaction or heat-absorption reaction occurred by transmitting light the intensity of which is modulated according to the pattern of the master. For example, as a result of the transmission of the light, the crystal structure (crystal-crystal, crystal-amorphous) of the recording layer changes, the shape of the recording layer is changed, or the atoms or molecules thereof are coupled or separated.

—Recording Layer—

As the recording layer, its material, shape, structure, size, etc. are appropriately selected depending on the intended purpose without any restriction. Examples of the shape include a flat plate, circular plate, disk, card, film, sheet, and the like. The structure may be a single-layered structure or laminate structure. The size may be appropriately selected depending on the intended use without any restriction.

The material of the recording layer is appropriately selected depending on the intended purpose without any restriction, provided that it changes the state thereof as a result of light exposure (e.g., a photothermal conversion material). The material is preferably an inorganic material, and examples thereof include: a semiconductor material such as Si, Ge, GaAs or the like; an intermetallic compound material including a low melting point metal such as Bi, Ga, In, Sn, or the like; a material such as BiTe, BiIn, GaSb, GaP, InP, InSb, InTe, SnSn, or the like; a carbide material such as C, SiC, or the like; an oxide material such as $V_2O_5$, $Cr_2O_3$, $Mn_3O_4$, $Fe_2O_3$, $Co_3O_4$, CuO, or the like; a nitride material such as AlN, GaN, or the like; and a phase change material such as SbTe, GeTe, BiTe, InSb, GaSb, GeSb, GeBiTe, GeSbTe, AgInSbTe, AgInSbTeGe, GeInSbTe, GaSbSnGe, GeSbSnMn, GeSbSnTe, InSbGeTe, InSbGeZn, or the like. Among these, the phase change material is particularly preferable.

The phase change material may be appropriately selected among those used as a recording layer material of a rewritable optical disk. For example, it is preferable to use a material that includes at least one element selected from Sb, Ge, Ga, In, Zn, Mn, Sn, Ag, Mg, Ca, Ag, Bi, Se and Te. Among these phase change materials, it is possible to select the desirable material(s) for use in terms of the thermal characteristics and optical characteristics thereof, but preferable examples thereof are AgGeSgTe alloy, AgInSbTe alloy, AgInSbTeGe alloy, GaSbSnGe alloy, GeSbSnMn alloy, GeInSbTe alloy, GeSbSnTe alloy, and the like.

In addition, a complex material having two or more functions, for example, a function of photothermal conversion and a function of changing the phase upon receiving heat may be used. Further, it may have a multi-layered structure which has a functional layer to efficiently receive reproduction light and a functional layer to control generated heat in order to raise the accuracy and efficiency of reproduction.

The method for forming the recording layer is appropriately selected depending on the intended purpose without any restriction. Preferable examples thereof include a plating method, a printing method, a sputtering method, a CVD method, an evaporation method, and the like. Among these, the sputtering method is particularly preferable.

The thickness of the recording layer is appropriately adjusted depending on the intended purpose without any restriction, and it is preferably 8 nm to 50 nm, more preferably 10 nm to 30 nm.

—Optical Reflection Member (Reflection Layer)—

It is preferable that an optical reflection member is disposed on the side of the pattern-transferring material opposed to the side where light is transmitted, at the time when the light is transmitted to the recording layer. The optical reflection member may be removed after the pattern is formed, that is, it is sufficient that the optical reflection member is provided only at the time when the pattern is formed. Also, in the case where the optical reflection member is disposed, it is necessary that the master is optically transmissive and light is transmitted through the master.

The optical reflection member is appropriately selected depending on the intended purpose without any restriction, and for example, a metallic material may be used. Preferable examples of the metallic material include: a metal such as Al, Au, Ag, Cu, or the like; alloys each containing each of the above-listed metals as a main constituent. As an element added at the time of forming the alloy, for example, Bi, In, Cr, Ti, Si, Cu, Ag, Pd, Ta, and the like may be used.

The optical reflection member increases utilization efficiency of light by reflecting the light, and also functions as a heat dissipating layer dissipating heat generated while recording.

The method for forming the optical reflection member is appropriately selected depending on the intended purpose without any restriction. Examples thereof include a plating method, a printing method, a sputtering method, a CVD method, an evaporation method, and the like. Among these methods, the sputtering method is particularly preferable.

The thickness of the optical reflection member is preferably 30 nm or more in view of securing utilization efficiency of light. However, the utilization efficiency of light and cooling speed are saturated above a certain thickness. Moreover, if the optical reflection member is too thick, the substrate may be warped due to a film stress or may be peeled-off. Therefore, it is preferable that the thickness is 300 nm or less.
—Protection Layer—

It is preferable that the pattern-transferring material contains the recording layer and a protection layer formed on the surface of the recording layer. The protection layer may be formed on both sides of the recording layer.

The material of the protection layer is appropriately selected from ones known in the art depending on the intended purpose without any restriction. Examples thereof include: respective oxides of Si, Zn, Sn, In, Mg, Al, Ti, Zr, and the like; respective nitrides of Si, Ge, Al, Ti, B, Zr, and the like; respective sulfides of Zn, Ta, and the like; respective carbides such as Si, Ta, B, W, Ti, Zr, etc.; diamond-like carbon; or mixtures thereof. Among these, the mixture of ZnS and $SiO_2$, the mole ratio of which is approximately 7:3 to 8:2 is preferable, and $(ZnS)_{80}(SiO_2)_{20}$ (mol %), in which the optical constant, thermal expansion coefficient, and resiliency are optimized, is particularly preferable.

The method for forming the protection layer is appropriately selected depending on the intended purpose without any restriction. Example thereof include a plating method, a printing method, a sputtering method, a CVD method, an evaporation method and the like. Among these, the sputtering method is particularly preferable.

It is preferable that the thickness of the protection layer is 40 nm to 80 nm in the case where $(ZnS)_{80}(SiO_2)_{20}$ (mol %) is used.

The pattern-transferring material is appropriately selected depending on the intended purpose without any restriction, but it is preferable that those having the same structure to that of an optical recording medium. Such structure of the optical recording medium is appropriately selected depending on the intended purpose without any restriction, but it is preferably a structure of a rewritable optical disk using a phase change material.

Although recording is usually carried out utilizing two states of amorphous and crystal in the rewritable type optical disk, a pattern is formed utilizing different crystal states (crystal-crystal) in the method for forming a pattern of the present invention. This is because it is difficult to form preferable reproduction light as it is necessary to modulate the power and the pulse width of laser light to be transmitted in order to quench the phase change material to form an amorphous mark, and also it is necessary to reduce the diameter of laser beam so that it takes a time to reproduce the pattern. On the other hand, if the crystal-crystal state is utilized, it is not necessary to quench, it is easy to form the reproduction light, and the time required for reproducing the pattern is shorter.

Figure 10:
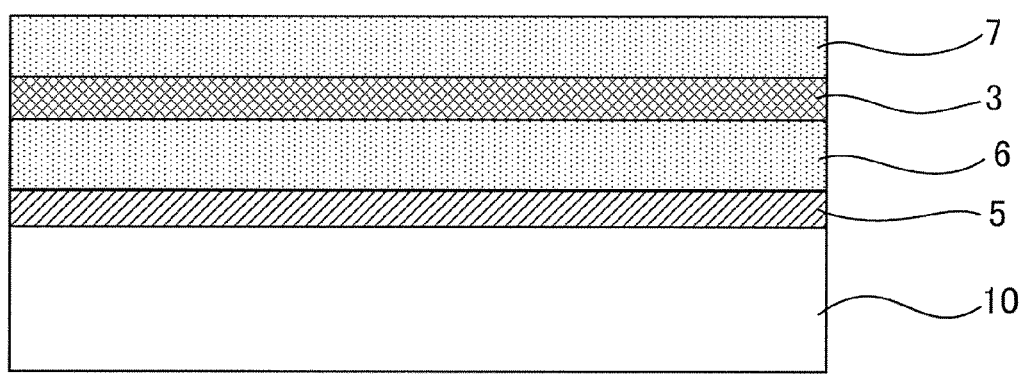
FIG. 10 is a schematic view showing one example of a layer structure of a pattern-transferring material.

As the rewritable optical disk, DVD+RW, DVD-RW, BD-RE, HD DVD RW and the like are listed. Among these, as shown in FIG. 10, the blue-ray disk at least containing a reflection layer 5, a first protection layer 6, a recording layer 3, and a second protection layer 7 disposed on the substrate 10 in order is particularly preferable. In the case of FIG. 10, the reproduction light is transmitted from the side of the second protection layer 7.

In this case, the pattern-transferring material and the master are stacked together in a manner that the second protection layer 7 which is an outer surface layer of the pattern-transferring material is brought into contact with the pattern of the master.

The reflection layer 5, the first protection layer 6, the recording layer 3, and the second protection layer 7 for use here are the same as mentioned above.

For the substrate of the pattern-transferring material, the shape, structure and size thereof are appropriately selected depending on the intended purpose without any restriction. For example, the shape thereof is a flat plate, the structure thereof is a single-layered structure or a laminate structure, and the size is appropriately selected corresponding to the size of the master.

In the case where the recording layer is formed by a coating film forming method represented by a spin-coating method, a dipping method, a doctor blade method, and the like, the substrate selected from those having resistance against a solution used in such the coating method. In the case where the substrate is heated in accordance with various vapor deposition film forming method, the substrate is selected from those having a heat-resistant property.

Examples of the material of the substrate include glass, ceramic, resin and the like. Among these, the resin is preferable in terms of its moldability and cost performance.

Examples of the ceramic are quartz, silicon, $SiO_2$, and the like.

Examples of the resin are polycarbonate resin, acrylic resin, epoxy resin, polystyrene resin, acrylonitrile-styrene copolymer, polyethylene resin, polypropylene resin, silicone-based resin, fluorine-based resin, ABS resin, urethane resin, and the like.

Among these, the polycarbonate resin and acrylic resin are preferable in view of their excellent moldability, optical characteristics, and cost performance.

Moreover, the pattern can be added with various functions such as a light diffusion function, light scattering function, light condensation function, light absorption function, and the like by disposing an optical material between the master and the pattern-transferring material which are stacked together.

The optical material is appropriately selected depending on the intended purpose without any restriction, provided that it is able to convert the intensity distribution and wavelength of reproduction light. Examples thereof include a refractive index contrasting material, a light path changing material, an optical scattering functional material, a light focusing functional material, a light absorbing functional material, an anisotropic functional material, and the like. In addition, examples thereof also include one capable of varying the intensity distribution of reproduction light according to the shape such as a concave lens, a convex lens and the like.

It is preferable that the refractive index contrasting material having a different refractive index from the refractive index of the pattern-transferring material is disposed on the pattern of the master stacked on the pattern-transferring material. In the pattern, the refractive index contrasting material may be disposed at least a concave portion or convex portion thereof.

The refractive index contrasting material is appropriately selected depending on the intended purpose without any restriction. Examples thereof include a light scattering material containing a binder resin and particles, having different refractive index to that of the binder resin. In this case, it is preferable that a combination of the binder resin and particles is selected so that the difference between the refractive index of the binder resin and that of the particles becomes 0.20 or more.

The particles are appropriately selected depending on the intended purpose without any restriction. For example, they may be roughly classified into organic particles and inorganic particles.

The inorganic particles are appropriately selected depending on the intended purpose without any restriction. Examples thereof include respective particles of talc, calcium carbonate, silicon, silica dioxide, alumina, and the like. These may be used as a single member or two or more thereof may be used together.

It is preferable that the weight average particle size of the inorganic particles is 0.1 μm to 1 μm, and the addition amount of the inorganic particles is 20% by mass to 60% by mass with respect to the amount of the binder.

Examples of the organic particles include particles formed from organic polymers such as cross-linked acrylic resin, cross-linked methacrylic resin, polyethylene resin, polypropylene resin, polystyrene resin, silicone resin, melamine resin, and the like. Among these, the cross-linked acrylic resin or methacrylic resin (PMMA resin) is particularly preferable.

The weight average particle size of the organic particles is preferably 0.1 μm to 5 μm, more preferably 0.1 μm to 1 μm.

It is preferable that the light path changing material configured to change a path of the light transmitted to a pattern-transferring material via the master is disposed on the pattern of the master stacked on the pattern-transferring material. The light path changing material may be disposed on at least one of the concave portion or the convex portion, but it is preferable that the concave portion is filled with the light path changing material so that a difference in the refractive index is increased.

The light path changing material is appropriately selected depending on the intended purpose without any restriction. Examples thereof include beads, a lenticular lens, a prism lens, a fly-eye lens, a flat lens in which micro petrosal bodies of cones and pyramids are laid in the X-Y directions.

Unlike photolithography, the pattern reproduced on the recording layer itself can work as a functional material without removing the recording layer along the pattern. Also, it is possible that a reproduction pattern is made into a cubic (three-dimensional) microstructural body by etching the pattern reproduced on the recording layer of the pattern-transferring material. In addition, utilizing differences in the optical and electrical characteristics of the recording layer, it is possible to produce various microstructures having novel functions.

A method for forming a pattern involves stacking the master having at least two-dimensional patterns or three-dimensional patterns formed thereon and a pattern-transferring material having at least a recording layer which changes the state thereof upon exposure with light, and transfers the pattern of the master to the recording layer by transmitting light thereto.

In this case, it is preferable that the master and the pattern-transferring material are stacked together in a manner that the surface of the master having a pattern formed thereon is located at the side of the pattern-transferring material.

At the time when the master and the pattern-transferring material are stacked together in a manner that the surface of the master having a pattern formed thereon is located at the side of the pattern-transferring material, it is preferable that they are adhered to and stacked together by vacuum adsorption.

The space between the master and the pattern-transferring material at the time they are stacked together is appropriately adjusted depending on the intended purpose without any restriction, but it is preferably 1 μm or less. In the case where the space is more than 1 μm, there may be cases where the pattern of the master is not accurately reproduced on the recording layer of the pattern-transferring material by reproduction light.

The reproduction is appropriately selected depending on the intended purpose without any restriction, but it may be carried out in the same manner as in initialization of a phase change optical disk. A sample having a master and a pattern-transferring material stacked together is held in a vacuum adsorbing state, and the reproduction light is transmitted to the sample while the reproduction light source is moved in the radius direction, and rotating the sample at arbitral revolutions.

As the reproduction light source, any arbitrarily selected light sources can be used depending on the purpose without any restriction. Examples thereof include a fluorescent lamp, a mercury lamp, a xenon lamp, a halogen lamp, a light-emitting diode, a laser beam, a flash lamp, and the like. Among these, the laser beam is particularly preferable in view of intensity of emitted light.

It is possible to transmit light from these light sources by guiding the same using an optical fiber, a lens optical system, an optical waveguide, and the like. Also, a plurality of light sources may be used in combination. In this case, a plurality of light sources may be arbitrarily combined, or a plurality of the same light sources may be used in combination. Further, light sources having different wavelength bands may be combined together or light sources having the same wavelength band may be combined together. Among these, it is preferable that the laser beam is used in view of heat generation from the light source and simplicity of the equipment, and it is further preferable that a plurality of different laser beams having mutually different wavelength bands are used in combination.

The wavelength of the light source is appropriately selected depending on the intended purpose without any restriction, but it is preferably 300 nm to 1,000 nm, more preferably 350 nm to 900 nm.

It is preferable that the minimum size of the pattern of the master is 0.3 times or more of the optical wavelength of the laser beam. If the minimum size of the pattern of the master is less than 0.3 times of the optical wavelength of the laser beam, there may be cases where the reproduction light cannot sufficiently reflect the pattern. Also, it is preferable that a focusing function is provided in order to efficiently utilize the power of the laser beam.

At least the two-dimensional pattern or three-dimensional pattern of the master is reproduced on the recording layer of the pattern-transferring material as a pattern, especially as a two-dimensional planar pattern, by irradiating the reproduction light to the sample in which the master and the pattern-transferring material are stacked together. This can be confirmed by observing the surface of the pattern-transferring material under a scanning electron microscope (SEM), and the fact that the reproduced pattern is a two-dimensional planar pattern can be confirmed by an atomic force microscope (AFM).

Since the method for forming a pattern does not require the pattern of the master to be of a cubic (three-dimensional) structure, unlike the nano-print method which requires a master to be of a cubic structure, it is simple to produce the master, and there is only extremely slight physical deterioration of the master as the master is not pressed onto the pattern-transferring material, and reproduction of the pattern is easily carried out even if the master and the pattern-transferring material are curved.

The element having a pattern of the present invention is appropriately selected depending on the intended purpose without any restriction. For example, it is a substrate having a pattern (particularly a planar pattern), and a supporting body having a pattern (particularly a planar pattern).

The element having a pattern of the present invention is the one in which a pattern, particularly, a planar pattern is reproduced from at least a two-dimensional pattern or a three-dimensional pattern, and can be applied in various fields. For example, it is applicable for various biosensors, a DNA chip, a protein detection chip, a healthcare chip of a µTAS (micro total analysis system), a DNA transistor, a security system, an optical element utilizing a nanometer scale effect, a metamaterial, and the like.

As the DNA chip, the pattern of the present invention is applicable for formation of an array pattern, for example, at the time when a publicly known single strand DNAs are arrayed and fixed in a predetermined pattern on a glass substrate of a DNA chip.

Examples of the optical element include: an optical reflection prevention nanostructure, for lowering optical reflection, in which nanometer scale structures smaller than the wavelength of light are disposed; a photonic crystal configured to artificially control the advancing direction of light, a ¼ wavelength plate configured to bring nanometer scale microstructures onto a surface of other optical components, and the like.

EXAMPLES

Hereinafter, examples of the present invention will be explained, but the present invention is not limited to the following examples.

Example 1

Production of Master

FIG. 1 shows a schematic view of a master having a three-dimensional pattern used in Example 1. The master was a substrate for DV+RW disk, which is a polycarbonate resin substrate having a thickness of 0.6 mm, the diameter of 120 mm and the centric hole diameter of 15 mm. On one surface of the master, grooves V having the groove width (concave portion) of 300 nm and the depth of 30 nm were spirally formed with a diameter width 44 mm to 118 mm, at a track pitch 740 nm were formed. The spiral grooves V were made into a three-dimensional pattern. It could be confirmed in the same manner as in Example 2 described later that the DVD-RW disk resin had a three-dimensional pattern.

—Production of Pattern-Transferring Material—

The pattern-transferring material was prepared by disposing a reflection layer, a first protection layer, a recording layer and a second protection layer on a polycarbonate resin substrate having no groove on the surface thereof in this order in accordance with a sputtering method. Note that, the reflection, the first protection layer, the recording layer and the second protection layer had thicknesses as shown in Table 1.

TABLE 1

| | Composition | Thickness |
|---|---|---|
| Second protective layer | ZnS(80 mol %)SiO$_2$(20 mol %) | 50 nm |
| Recording layer | Ag$_{0.5}$In$_{5.0}$Sb$_{67.7}$Te$_{23.8}$Ge$_{3.0}$(atom %) | 20 nm |
| First protective layer | ZnS(80 mol %)SiO$_2$(20 mol %) | 20 nm |

TABLE 1-continued

| | Composition | Thickness |
|---|---|---|
| Reflection layer | Ag | 200 nm |
| Substrate | Polycarbonate resin: no groove | |

Figure 2:
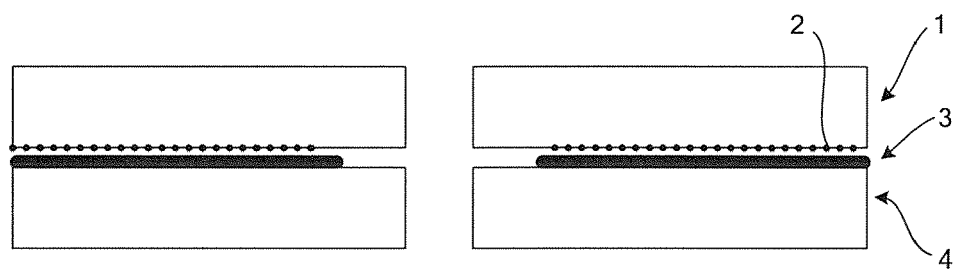
FIG. 2 is a schematic view showing a state where a master and a pattern-transferring material according to Example 1 are stacked together.

Next, as shown in FIG. 2, the produced pattern-transferring material 4 and the master 1 were stacked together. At this time, the first protection layer (not illustrated) disposed on the recording layer 3 of the pattern-transferring material and the pattern 2 of the master were vacuum-adsorbed in order to increase the degree of adhesion therebetween to thereby produce a sample.

—Reproduction—

Next, Model POP120-8E manufactured by Hitachi Computer Peripherals Co., Ltd. was used as a light source for reproduction. This light source is generally used for initialization of a phase-change optical disk, and is provided with a semiconductor laser of a wavelength of 830 nm, which has a beam size having a length of 75 µm and width of 1 µm in the radius direction of the sample, and an optical head having a focus servo mechanism.

The reproduction was carried out in an almost identical manner as to initialization of a phase-change optical disk, wherein a laser beam was transmitted from the side of the master to an area of the master where grooves were disposed, while rotating the sample at an arbitral number of revolution and moving the same in the radius direction with the sample held in a vacuum-adsorbed state. In Example 1, the reproduction was carried out under the conditions shown in Table 2. The reproduction was completed in approximately 40 seconds per sample under the conditions.

TABLE 2

| | |
|---|---|
| Emission laser power | 800 mW |
| Feed rate of the optical head | 36 µm/revolution |
| Linear speed of revolution of the laminated sample | 8 m/s |

Next, after the reproduction light was transmitted, the pattern-transferring material and the master were peeled off. The surface of the pattern-transferring material was observed with naked eyes, and it was seen an interference color resulting from interference of light, when was also seen on the surface of the master. It is assumed that the groove pattern formed on the master was reproduced on the recording layer of the pattern-transferring material.

The surface of the thus obtained pattern-transferring material was then observed under a scanning electron microscope (SEM: ULRA55, Carl Zeiss). As the sample for SEM observation, a test piece was obtained by cutting the pattern-transferring material to an appropriate size and exposing the recording layer by dissolving ZnS (80 mol %)-SiO$_2$ (20 mol %) of the second protection layer being the outer surface layer by using fluorinated acid. This is because since ZnS (80 mol %)-SiO$_2$ (20 mol %) of the second protection layer does not have any conductive properties, an electronic image will be disturbed due to the occurrence of charge-up at the time of the observation under the SEM.

Figure 3:
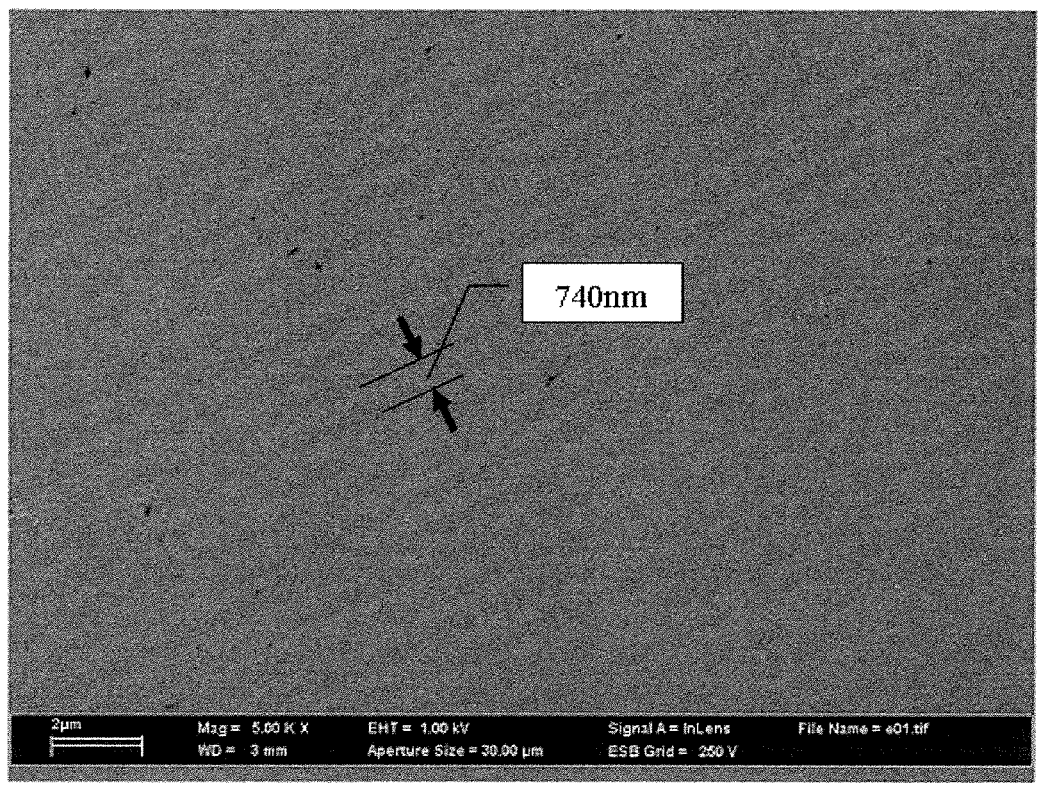
FIG. 3 is a SEM photograph of a spiral groove pattern reproduced in Example 1.

A SEM photograph of the sample produced is shown in FIG. 3. Based on the result of FIG. 3, dark and light lines were recognized, and the line pitch was 740 nm. Therefore, it was found that a spirally grooved pattern of the master was reproduced on the recording layer of the pattern-transferring material.

In addition, it was confirmed in the same manner as in Example 2 that the pattern reproduced on the recording layer of the pattern-transferring material was planar (two-dimensional).

As mentioned above, it was found that a three-dimensional spirally grooved pattern of the master was efficiently reproduced onto the pattern-transferring material as a two-dimensional flat pattern at a high speed.

Example 2

Production of Master

Figure 4:
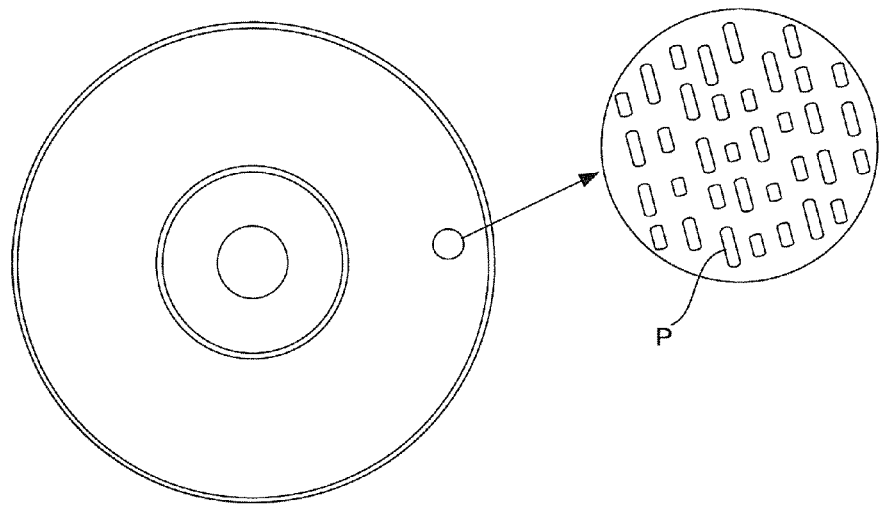
FIG. 4 is a schematic view showing one example of a master used in Example 2.
Figure 5A:
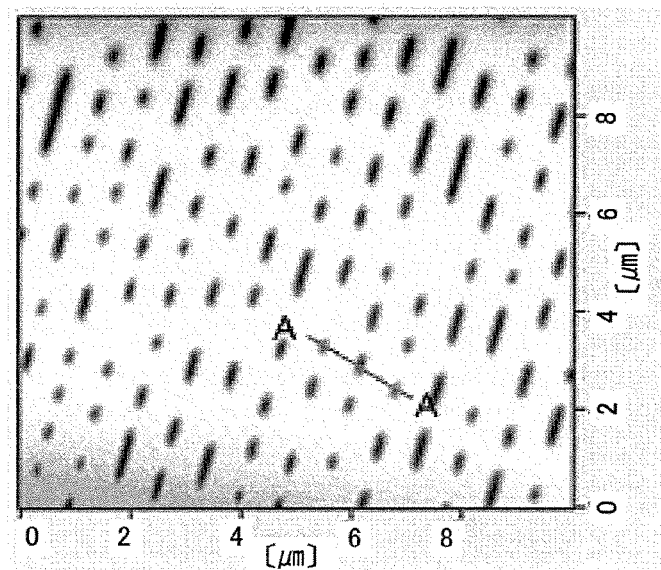
FIG. 5A is a scanning view of the master used in Example 2.
Figure 5B:
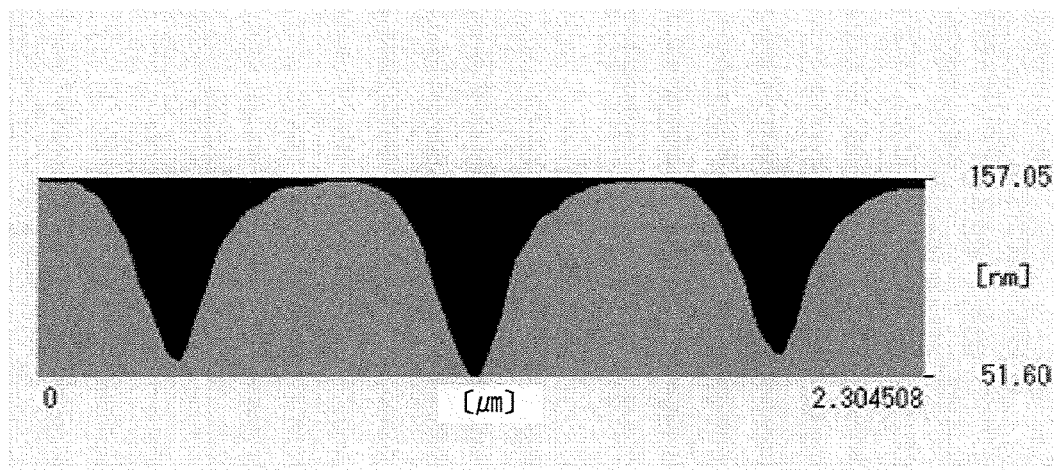
FIG. 5B is a cross sectional view taken along the line A-A.

A DVD-ROM substrate was reproduced in the same manner as in Embodiment 1, except that a DVD-ROM substrate shown in FIG. 4 was used as the master instead of the DVD-RW disk substrate of Example 1. The DVD-ROM substrate has dents called pits P on the surface as shown in FIG. 4, wherein ten length variations of pits between the minimum pit length 0.4 µm to the maximum pit length 2.13 µm were formed at random, and these pits corresponded to the three-dimensional pattern of Example 2. FIG. 5A is a view obtained by scanning the DVD-ROM substrate. FIG. 5B shows the result of measuring the sectional state along the line A-A in the drawing by means of Nonopics 2100 made by Seiko Instruments Inc. Based on FIG. 5B, it was recognized that three pits had a dent of approximately 100 nm deep (i.e., a three-dimensional pattern).

—Pattern-Transferring Material—

As the pattern-transferring material, a pattern-transferring material in which a reflection layer, a first protection layer, a recording layer and a second protection layer, each having the same thicknesses as in Example 1 shown in Table 1 were formed in this order by a sputtering method.

—Reproduction—

Figure 6:
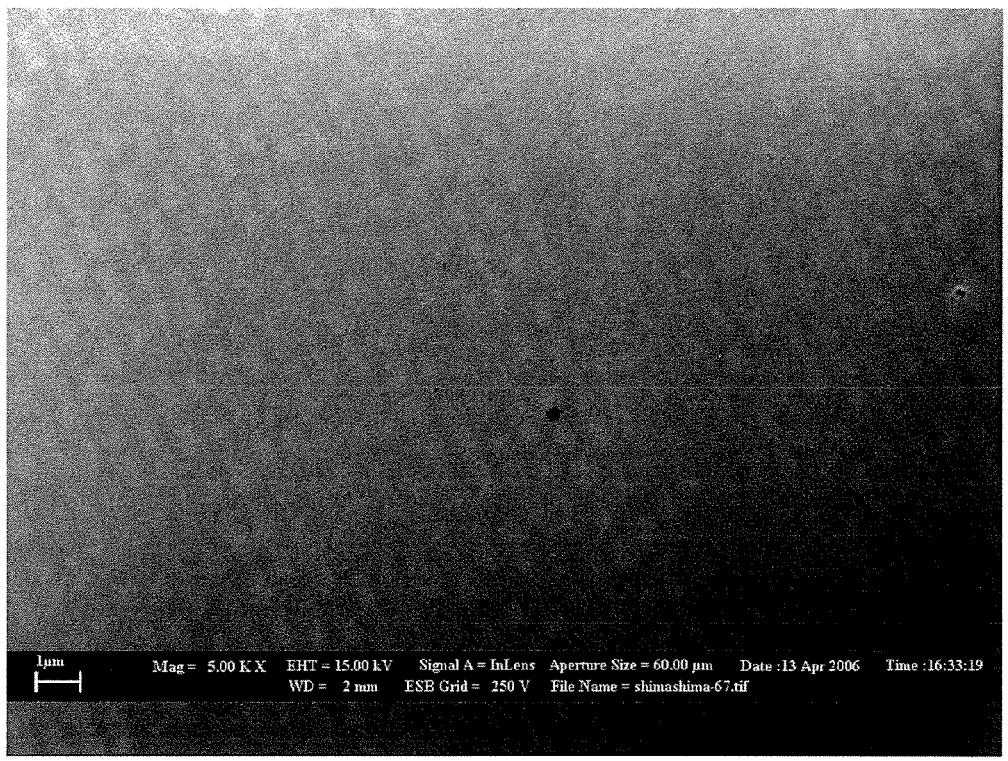
FIG. 6 is a SEM photograph of a pit pattern reproduced in Example 2.

Next, the master and a pattern-transferring material were stacked together and vacuum-adsorbed to form a sample. After reproduction light was transmitted to the sample in the same manner as in Example 1, the pattern-transferring material and the master were peeled off, and the surface of the pattern-transferring material was observed with naked eyes. An interference color resulting from light interference was observed on the surface of the pattern-transferring material in the master as on the surface of the master. It was assumed that this was because the pits formed on the master were reproduced to the recording layer of the pattern-transferring material. Thereafter, an SEM observation was conducted in the same manner as in Embodiment 1. The result thereof is shown in FIG. 6. Based on the result, it was found that that the pattern corresponding to the pit pattern of the master was reproduced on the recording layer of the pattern-transferring material.

Figure 7A:
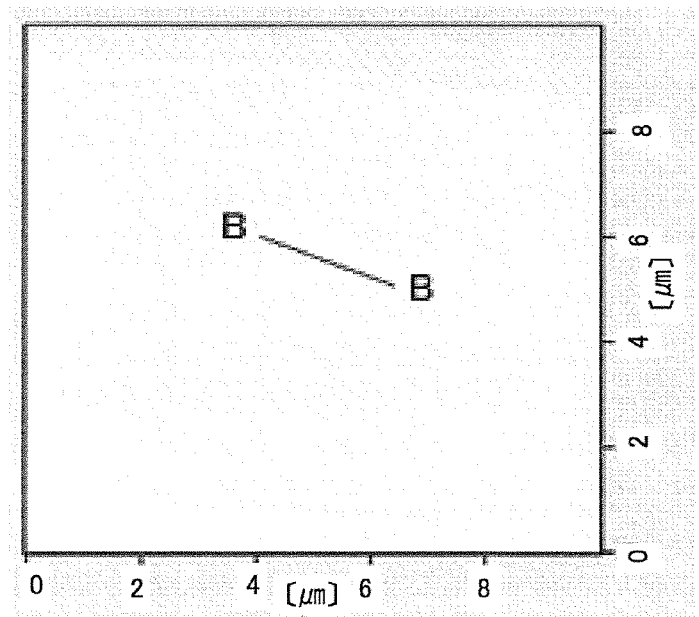
FIG. 7A is a scanning view of the surface of the recording layer surface in Example 2.
Figure 7B:
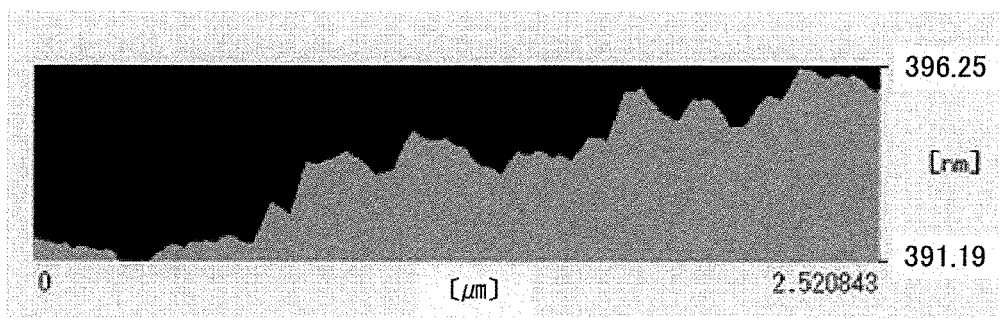
FIG. 7B is a cross sectional view taken along the line B-B.

FIG. 7A is a view obtained by scanning the surface of the recording layer of a pattern-transferring material after reproduction. FIG. 7B shows the result of measuring the sectional state along the line B-B in the drawing by means of Nonopics 2100 made by Seiko Instruments Inc. Based on FIG. 7B, it appeared that the sectional state had changed, but it was found that the change was noise (refer to the graduation) of 13 nm and the surface was substantially flat (i.e., two-dimensional). As a result, it was confirmed that the reproduced pattern was flat (i.e., two-dimensional).

As mentioned above, it was found that a three-dimensional spiral groove pattern on the master was efficiently reproduced on the pattern-transferring material as a two-dimensional planar pattern at a high speed.

Example 3

Production of Master

A BD-RE disk substrate was used as a master instead of the DVD-RW disk substrate in Example 1. On the master, grooves V having a track pitch of 320 nm, a groove (concave portion) width of 160 nm, and a depth of 20 nm were spirally formed in the area having a diameter of 44 mm to 118 mm. The master was substantially the same to that of Example 1 except that the spiral grooves V were made into a three-dimensional pattern. It was confirmed in the same manner as in Example 2 that the BD-RE disk substrate had a three-dimensional pattern.

—Production of Pattern-Transferring Material—

As the pattern-transferring material, a recording layer which is the same as that of Example 1 was formed by a sputtering method on a polycarbonate resin substrate free from any grooves on the surface thereof with the same size as that of the master.

Note that, the pattern-transferring material was formed of the recording layer, unlike the case of Example 1, as it was necessary to transmit the reproduction light having the information of the master as direct as possible to the recording layer so as to transfer the pattern of the BD-RE disk substrate which was in a smaller size, it is necessary to irradiate reproduction light having information of the master onto the recording layer as directly as possible, and it was also necessary to reflect the information of the master included in the reproduction light on the heat generated in the recording layer due to the reproduction light.

Next, reproduction was carried out by stacking the produced pattern-transferring material 4 and the master 1 by vacuum adsorption in the same manner as in Example 1.

Next, after reproduction light was transmitted, the pattern-transferring material and the master were peeled off. The surface of the pattern-transferring material was observed with naked eyes, and it was observed that an interference color occurred resulting from light interference as on the surface of the master. Accordingly, tt was assumed that the groove pattern formed on the master was reproduced on the recording layer of the pattern-transferring material.

A SEM observation was conducted to observe the surface of the obtained pattern-transferring material in the same manner as in Example 1.

Figure 8:
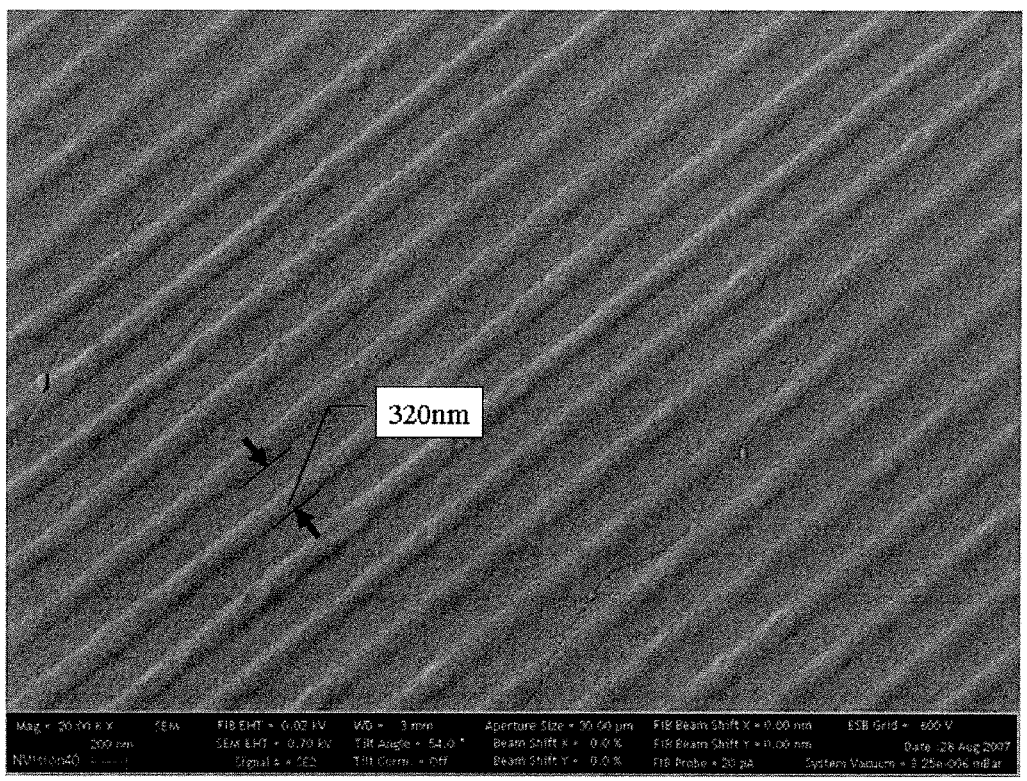
FIG. 8 is a SEM photograph of a spiral groove pattern reproduced in Example 3.

FIG. 8 shows a SEM photograph of the produced sample. Based on the result of FIG. 8, since dark and light lines were recognized and the line pitch was 320 nm, it was found that the spiral groove pattern of the master was reproduced on the recording layer of the pattern-transferring material.

Based on the above description, it was found that the three-dimensional spiral groove pattern of the master was efficiently reproduced on the pattern-transferring material at a high speed.

Example 4

A character string "DVD-ROM" depicted on the DVD-ROM substrate used in Example 2 was reproduced in the same manner as in Example 1. The character string was three-dimensionally recorded on the DVD-ROM substrate by a laser marker.

Figure 9:
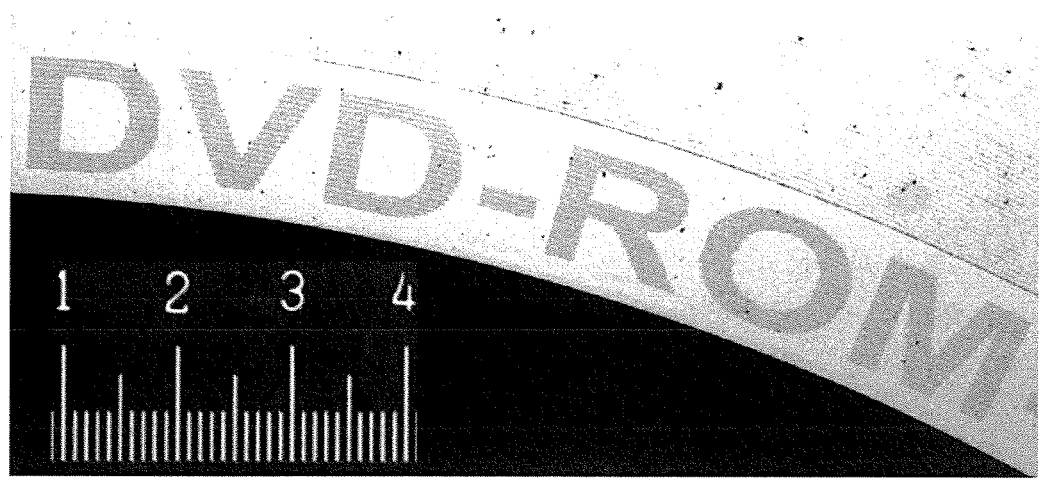
FIG. 9 is a microscopic photograph of a character pattern reproduced in Example 4.

After reproduction light was transmitted, the pattern-transferring material and the master were peeled off, and the surface of the pattern-transferring material was observed under a microscope. The result is shown in FIG. 9. The figures of the scale shown in FIG. 9 were based on the unit mm, and the minimum width was 1/10 mm. From the result of FIG. 9, it was found that the characters of unit mm were clearly reproduced.

In addition, it was confirmed in the same manner as in Example 2 that the character pattern reproduced on the recording layer of the pattern-transferring material was flat (i.e., two-dimensional).

Therefore, it was found that a three-dimensional millimeter scale character string on the master was efficiently reproduced on the pattern-transferring material as a two-dimensional flat pattern at a high speed.

In the pattern and pattern forming method, it is possible to efficiently reproduce at least a two-dimensional pattern or a three-dimensional pattern formed on the master on the recording layer of the pattern-transferring material as a pattern or, particularly, a planar pattern. For example, they can be applied to, for example, a biosensor, a DNA chip, a protein detection chip, a healthcare chip of a μTAS (micro total analysis system), a DNA transistor, a security system, an optical element utilizing a nanometer scale effect, a metamaterial, and the like.

What is claimed is:

1. A method for forming a pattern, comprising:
   stacking a master having at least a two-dimensional pattern or a three-dimensional pattern formed thereon, and a pattern-transferring material comprising at least a recording layer which changes a state thereof as light is transmitted thereto; and
   transmitting light to the recording layer so as to transfer the pattern of the master onto the recording layer,
   wherein the master is optically transmissive, and the light is transmitted through the master to the pattern-transferring material,
   wherein the pattern of the master generates at least one difference in the light transmitting therethrough, the at least one difference being selected from the group consisting of optical characteristics, difference in light paths, and shape, and
   wherein the light with the at least one difference is irradiated on the recording layer and forms the pattern on the recording layer as the change in the state thereof.

2. The method for forming a pattern according to claim 1, wherein the pattern is a planar pattern.

3. The method for forming a pattern according to claim 1, wherein the pattern is a concave-convex pattern.

4. The method for forming a pattern according to claim 1, wherein the master is stacked to the pattern-transferring material so that a surface of the master on which the pattern is formed is faced to the pattern-transferring material.

5. The method for forming a pattern according to claim 1, wherein the recording layer is formed of an inorganic material.

6. The method for forming a pattern according to claim 1, wherein an optical reflection member is disposed on a side of the pattern-transferring material which is opposed to a side thereof to where the light is transmitted at the time when the light is transmitted to the recording layer.

7. The method for forming a pattern according to claim 6, wherein the optical reflection member is formed of a metallic material.

8. The method for forming a pattern according to claim 1, wherein the pattern-transferring material consists of the recording layer.

9. The method for forming a pattern according to claim 1, wherein the pattern-transferring material further comprises a protection layer disposed on a surface of the recording layer.

10. The method for forming a pattern according to claim 1, wherein the pattern transferred onto the recording layer is formed from different crystal phases.

11. The method for forming a pattern according to claim 1, wherein an optical material is disposed between the master and the pattern-transferring material which are stacked together.

12. The method for forming a pattern according to claim 1, wherein a refractive index contrasting material is disposed on the pattern of the master stacked on the pattern-transferring material, and wherein the refractive index contrasting material has a different refractive index to a refractive index of the pattern-transferring material.

13. The method for forming a pattern according to claim 1, wherein a light path changing material is disposed on the pattern of the master stacked on the pattern-transferring material, and wherein the light path changing material is configured to change a light path of the light transmitted to the pattern-transferring material through the master.

14. The method for forming a pattern according to claim 13, wherein the light path changing material is beads.

* * * * *